Oct. 6, 1936.   R. H. SOMERS ET AL   2,056,216
SYSTEM OF AND APPARATUS FOR OBSERVATION AND FOR RANGE AND POSITION FINDING
Filed Nov. 21, 1934
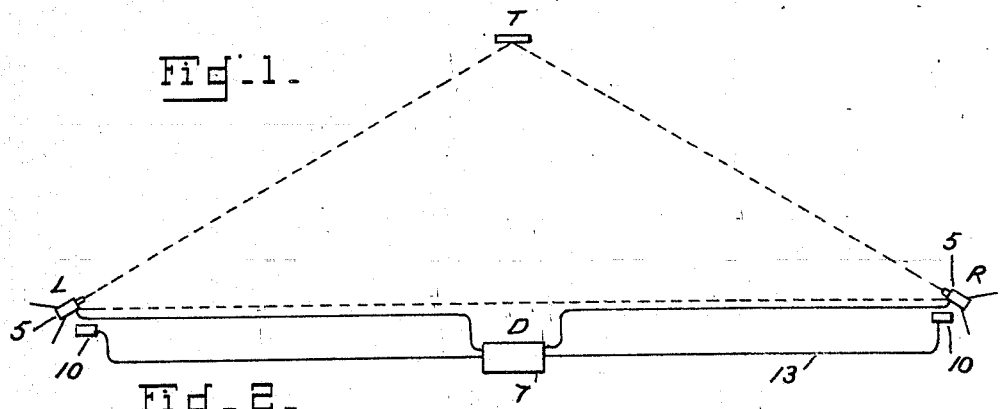
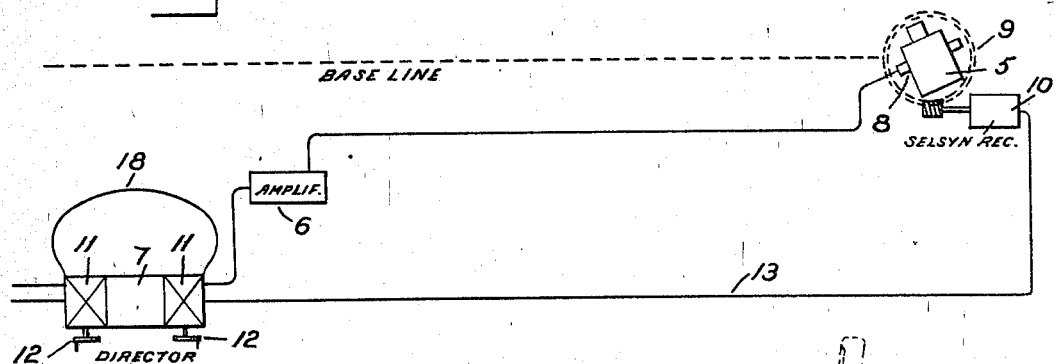
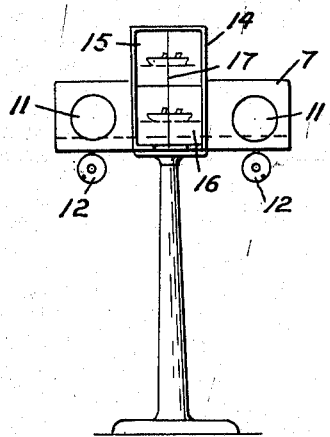
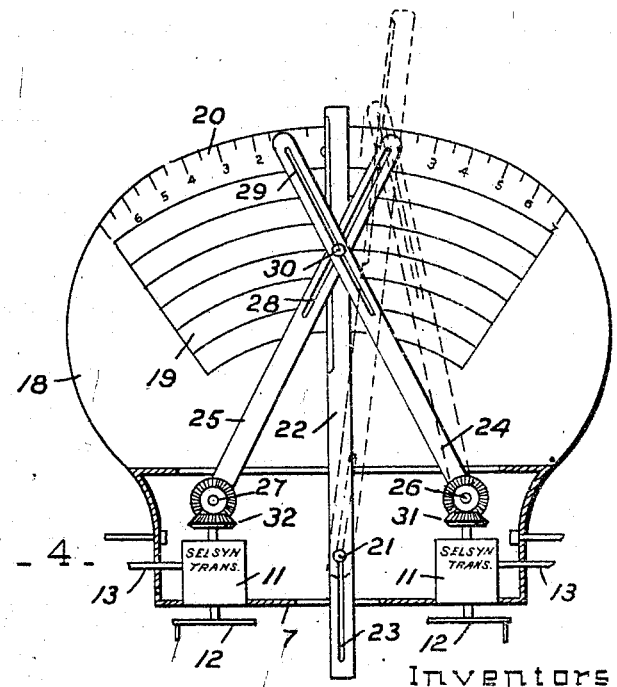
Inventors
Richard H. Somers
James L. Guion
James C. Karnes
By W. N. Roach
Attorney Patented Oct. 6, 1936

2,056,216

UNITED STATES PATENT OFFICE 2,056,216

SYSTEM OF AND APPARATUS FOR OBSERVATION AND FOR RANGE AND POSITION FINDING

Richard H. Somers, United States Army, Mickleton, N. J., James L. Guion, United States Army, Kansas City, Mo., and James C. Karnes, Buffalo, N. Y.

Application November 21, 1934, Serial No. 754,092

2 Claims. (Cl. 177—351)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a system of and apparatus for observation and for range and position finding.

In fire control systems for heavy artillery it is customary to observe the target from opposite ends of a base line and to thereby obtain data which is used in determining the range and bearing of the target with respect to a gun station. Generally there are a number of possible targets in the field of view and the observers at the base end stations frequently sight on different objects with the result that the data calculated from their observations is erroneous.

With a view to eliminating this source of error it is proposed in the present invention to have a person at a director station observe an object as viewed from the base end stations and to permit him to control the observing instruments at the base end station.

A further object of the invention is to associate the control at the director station with mechanism for determining the range and position of the object.

A practical embodiment of the invention is illustrated in the accompanying drawing, wherein:

Fig. 1 is a diagrammatic view illustrating the system of the invention.

Fig. 2 is a similar view of a part of the system and showing the apparatus in plan.

Fig. 3 is a view in rear elevation of the image receiver at the director station.

Fig. 4 is a plan view partly in section of the image receiver.

Referring to the diagram of Fig. 1 the problem is to observe an object or target T from a director station D through the instrumentality of widely separated observing units at the opposite ends R and L of a base line of known length and to control the positioning of the observing units from the director station D.

The observing units are identical and each consists of a television eye or camera 5 adapted to register an image of the target T and transmit it through a transmission system C and an amplifying station 6 to a receiver 7 at the director station.

The camera is mounted for movement in elevation on trunnions 8 which are carried by a support 9 which is mounted for movement in azimuth. The support is rotated in azimuth by a self-synchronous system (known commercially as a selsyn system) for the transmission of angular motion. The system includes a receiving motor 10 at the camera, a transmitting motor 11 with hand control 12 at the receiver 7, and the usual power and control conductors indicated at 13.

The television receiver 7 has a window 14 through which a pair of view-plates 15 and 16 are visible. The view plates 15 and 16 respectively retrace or reproduce the images of the cameras at the stations R and L. The reproduced images which are erect and preferably one above the other are conveniently compared as to centering against a reference line 17 on the window.

The transmitting motors 11—11 produce movements which are representative of the angular relation of the right and left cameras with respect to the base line. These movements are utilized in a plotting system which includes a board 18 carrying a range chart 19 and an azimuth scale 20, both based on the position of a pin 21 which represents the direct station D. An azimuth reading arm 22 adapted to indicate on the scale 20 has a slot 23 for receiving the pin 21.

A pair of arms 24 and 25, mounted on pivots 26 and 27 respectively representing the cameras at R and L, have slots 28 and 29 for receiving a pin 30 on the arm 22. The arms 24 and 25 are rotated about their pivots by gearing 31 and 32 respectively driven from the right and left transmitting motors 11 of the selsyn system.

When the right and left transmitting motors 11—11 are actuated to direct the cameras onto the target T, the arms 24 and 25 will be rotated a proportionate amount and will represent the lines R T and L T so that the point of their intersection represented by the pin 30 will indicate the relative position of the target on the pointing system. The range from D to T is read from the chart 19 and the azimuth position of T with respect to D is read from the scale 20.

The operator of the receiver 7 at the director station actuates the hand controls 12 of the motors 11 and causes the cameras to sweep the field until they are both directed at the same object or target.

The movement of the cameras in elevation is preferably controlled by operators at the camera stations in order to avoid duplication of the selsyn systems. When the images at the receiver are in registration, the azimuth bearing and the range of the target from the director station are indicated by the plotting system. In accordance with well known practice the future position of the target may be predicted.

We claim.

1. In apparatus of the class described, a pair of spaced television cameras, a television receiver for retracing the images of the cameras and presenting them for comparison, systems for the transmission of angular movements whereby the observer of the images at the receiver controls the movement of the cameras, and a plotting system including pivoted arms actuated by the transmitter motor of the selsyn systems.

2. In apparatus of the class described, a pair of spaced television cameras, a television receiver for retracing the images of the cameras and presenting them for comparison, systems for the transmission of angular movements whereby the observer of the images at the receiver controls the movement of the cameras, and a plotting system including elements actuated by the transmitter motors of the selsyn systems for determining positional data of the object observed by the cameras.

RICHARD H. SOMERS.
JAMES L. GUION.
JAMES C. KARNES.